(12) United States Patent
Reddy et al.

(10) Patent No.: US 9,704,145 B2
(45) Date of Patent: Jul. 11, 2017

(54) SYSTEM AND METHOD FOR REMOTE PAYMENT FOR AN ELECTRIC VEHICLE CHARGING STATION

(71) Applicant: SemaConnect, Inc., Bowie, MD (US)

(72) Inventors: Mahidhar Reddy, Annapolis, MD (US); Harsha Kollaramajalu, Bangalore (IN); Roman Stanchak, Baltimore, MD (US)

(73) Assignee: SemaConnect, Inc., Bowie, MD (US)

( * ) Notice: Subject to any disclaimer, the term of this patent is extended or adjusted under 35 U.S.C. 154(b) by 98 days.

(21) Appl. No.: 13/710,717

(22) Filed: Dec. 11, 2012

(65) Prior Publication Data

US 2014/0164196 A1    Jun. 12, 2014

(51) Int. Cl.
| | | |
|---|---|---|
| *G07F 19/00* | (2006.01) | |
| *G06Q 20/14* | (2012.01) | |
| *G06Q 20/18* | (2012.01) | |
| *G06Q 20/32* | (2012.01) | |
| *G06Q 20/40* | (2012.01) | |
| *G07F 15/00* | (2006.01) | |
| *H04L 29/00* | (2006.01) | |

(52) U.S. Cl.
CPC .......... *G06Q 20/145* (2013.01); *G06Q 20/18* (2013.01); *G06Q 20/3276* (2013.01); *G06Q 20/4012* (2013.01); *G07F 15/005* (2013.01); *Y02T 90/12* (2013.01); *Y02T 90/128* (2013.01); *Y02T 90/169* (2013.01); *Y04S 30/14* (2013.01)

(58) Field of Classification Search
USPC .......................................................... 705/34
See application file for complete search history.

(56) References Cited

U.S. PATENT DOCUMENTS

| | | | | |
|---|---|---|---|---|
| 8,421,592 B1* | 4/2013 | Gunasekara | .......... | H04W 12/06 320/104 |
| 8,452,661 B2* | 5/2013 | Karch | ................. | B60L 11/1848 320/109 |
| 8,566,237 B2* | 10/2013 | Forzley | ................. | G06Q 20/00 345/156 |
| 8,572,411 B2* | 10/2013 | Ginter | ..................... | G06F 21/10 345/59 |

* cited by examiner

*Primary Examiner* — Garcia Ade
(74) *Attorney, Agent, or Firm* — Vector IP Law Group; Robert S. Babayi

(57) ABSTRACT

A system and method is provided for billing transactions associated with an electric vehicle charging station (EVCS). A server may receive a station identifier associated with the EVCS from a computing device. The station identifier may be retrieved by decoding a code at the computing device. The code may include a graphic bit pattern that is configured to be decoded based on an optically captured representation of the code. The server may determine whether the EVCS is legitimate based on the station identifier. The server may provide a signal to the EVCS to initiate charging of a vehicle plugged into the EVCS in response to a determination that the EVCS is legitimate.

18 Claims, 4 Drawing Sheets

SYSTEM AND METHOD FOR REMOTE PAYMENT FOR AN ELECTRIC VEHICLE CHARGING STATION

TECHNICAL FIELD

The present disclosure relates to the field of electric vehicle charging stations. More specifically, the present disclosure relates to payment associated with electric vehicle charging stations.

BACKGROUND

An electric vehicle charging station supplies electric energy for charging/recharging of an electric vehicle plugged into the station. A user of the electric vehicle is charged a particular rate for utilizing the electric vehicle charging station for charging the electric vehicle. What is needed is a reliable way to remotely perform payment/billing transactions associated with electric vehicle charging stations.

These and other drawbacks exist.

BRIEF SUMMARY

Various systems, computer program products, and methods for billing transactions associated with an electric vehicle charging station (EVCS) are described herein.

According to one aspect of the present disclosure, the method may include a plurality of operations. In some implementations, the operations may include receiving a station identifier associated with the EVCS from a computing device, wherein the station identifier is retrieved by decoding a code at the computing device, wherein the code includes a graphic bit pattern that is configured to be decoded based on an optically captured representation of the code. In some implementations, the operations may include determining whether the EVCS is legitimate based on the station identifier. In some implementations, the operations may include providing a signal to the EVCS to initiate charging of a vehicle plugged into the EVCS in response to a determination that the EVCS is legitimate.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
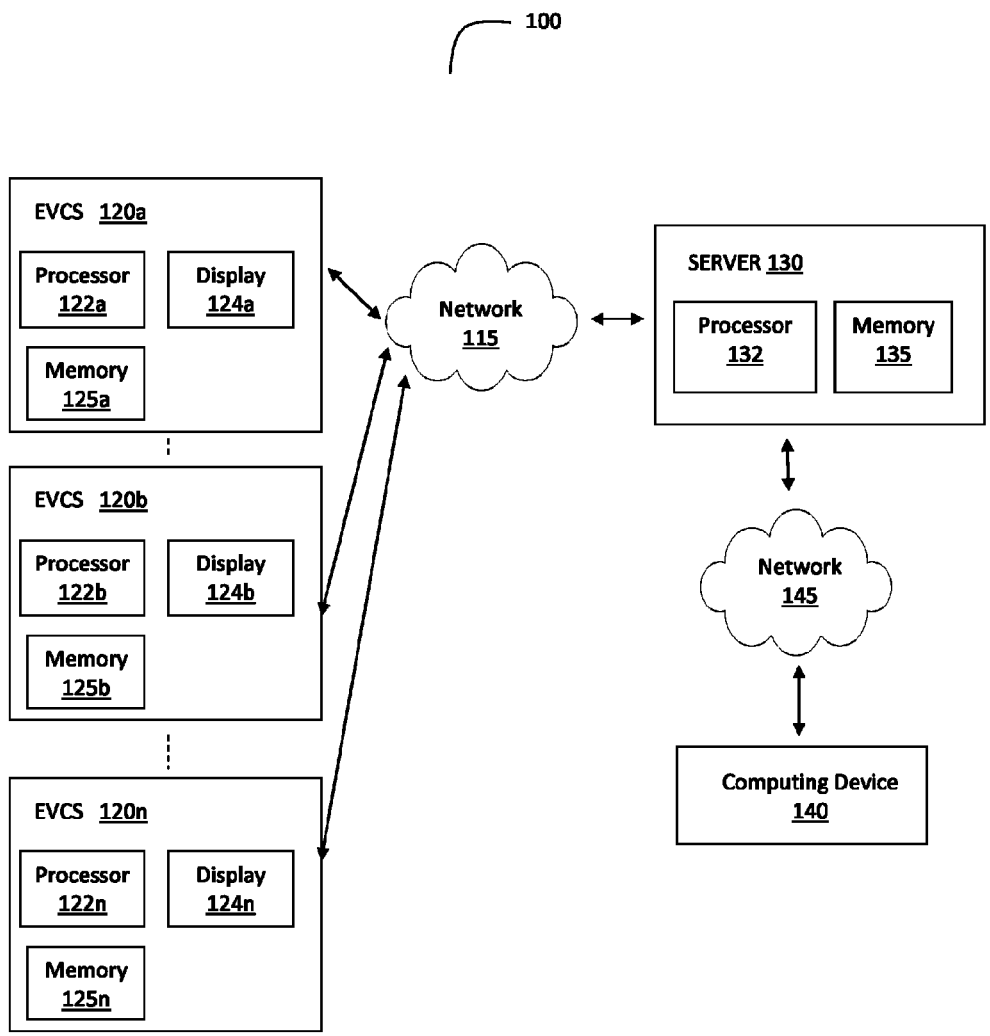
FIG. 1 illustrates an exemplary electric vehicle charging system, according to various implementations of the invention.

FIG. 1 is block diagram illustrating an electric vehicle charging system 100, according to various implementations of the invention. Electric vehicle charging system 100 may include an electric vehicle charging station (EVCS) 120 (illustrated in FIG. 1 as a plurality of electric vehicle charging stations 120a . . . 120n) that may be used to charge/recharge electric vehicles plugged into the EVCS. A user of an electric vehicle may drive to a location where the electric vehicle charging station is made available (for example, at offices, schools, hotels, retail, other parking lots/garages, and/or other locations) to charge the electric vehicle. Each electric vehicle charging station may include a processor 122, memory 125, and display 124 (illustrated in FIG. 1 as processor 122a, 122b, . . . , 122n, respectively; memory 125a, 125b, . . . , 125n, respectively; and display 124a, 124b, . . . , 124n, respectively). In some implementations, processor 122 includes one or more processors configured to perform various functions of EVCS 120. In some implementations, memory 125 includes one or more tangible (i.e., non-transitory) computer readable media. Memory 125 may include one or more instructions that when executed by processor 122 configure processor 122 to perform various functions of EVCS 120.

Electric vehicle charging system 100 may include a computing device 140 associated with the user of the electric vehicle. In some implementations, computing device 140 may include a mobile computing/processing device such as a wireless phone, a personal digital assistant, a smart phone, a tablet computing device, and/or other portable computing device that may be utilized to interact with server 130. In some implementations, computing device 140 may include a camera (not illustrated in FIG. 1) that may be used to capture information displayed via a display (for example, display 124) associated with the EVCS 120. Computing device 140 may include a processor (not otherwise illustrated in FIG. 1), circuitry, and/or other hardware operable to execute computer-readable instructions.

In some implementations, computing device 140 may execute a computer application (not otherwise illustrated in FIG. 1) that is configured to decode information captured from EVCS 120 and communicate with server 130. In some implementations, computing device 140 may include a memory (not otherwise illustrated in FIG. 1) that includes one or more tangible (i.e., non-transitory) computer readable media. The memory may include one or more instructions that when executed by the computing device processor configures the processor to perform functions of computing device 140/computer application.

In some implementations, the computer application executed by computing device 140 may be utilized by the user to register with the server 130. During registration, computer application may prompt the user to enter his/her user id (for example, user name, or other identifier) and password into a user interface associated with the computer application. The computer application may communicate with the server 130 and transmit the user id and password to the server 130. The server 130 may create a charge account associated with the user and store the user id and password entered during registration at the server 130 (in memory 135, for example).

In some implementations, server 130 may perform various functions associated with payment/billing transactions for EVCS 120. In some implementations, server 130 may manage charge accounts associated with users of electric vehicles. In some implementations, server 130 may include a processor 132, a memory 135, and/or other components that facilitate the functions of server 130. In some implementations, processor 132 includes one or more processors configured to perform various functions of server 130. In some implementations, memory 135 includes one or more tangible (i.e., non-transitory) computer readable media. Memory 135 may include one or more instructions that when executed by processor 132 configure processor 132 to perform functions of server 130. In some implementations, memory 135 may include one or more instructions stored on tangible computer readable media that when executed at a remote device, such as computing device 140, cause the computing device to facilitate interaction with the server, as described herein.

In some implementations, electric vehicle charging station 120 may be communicatively coupled to server 130 via network 115. In some implementations, computing device 140 may be communicatively coupled to server 130 via network 145. In some implementations, network 115 and network 145 may include a Local Area Network, a Wide Area Network, a cellular communications network, a Public Switched Telephone Network, a wireless communication network, and/or other network or combination of networks.

Figure 2:
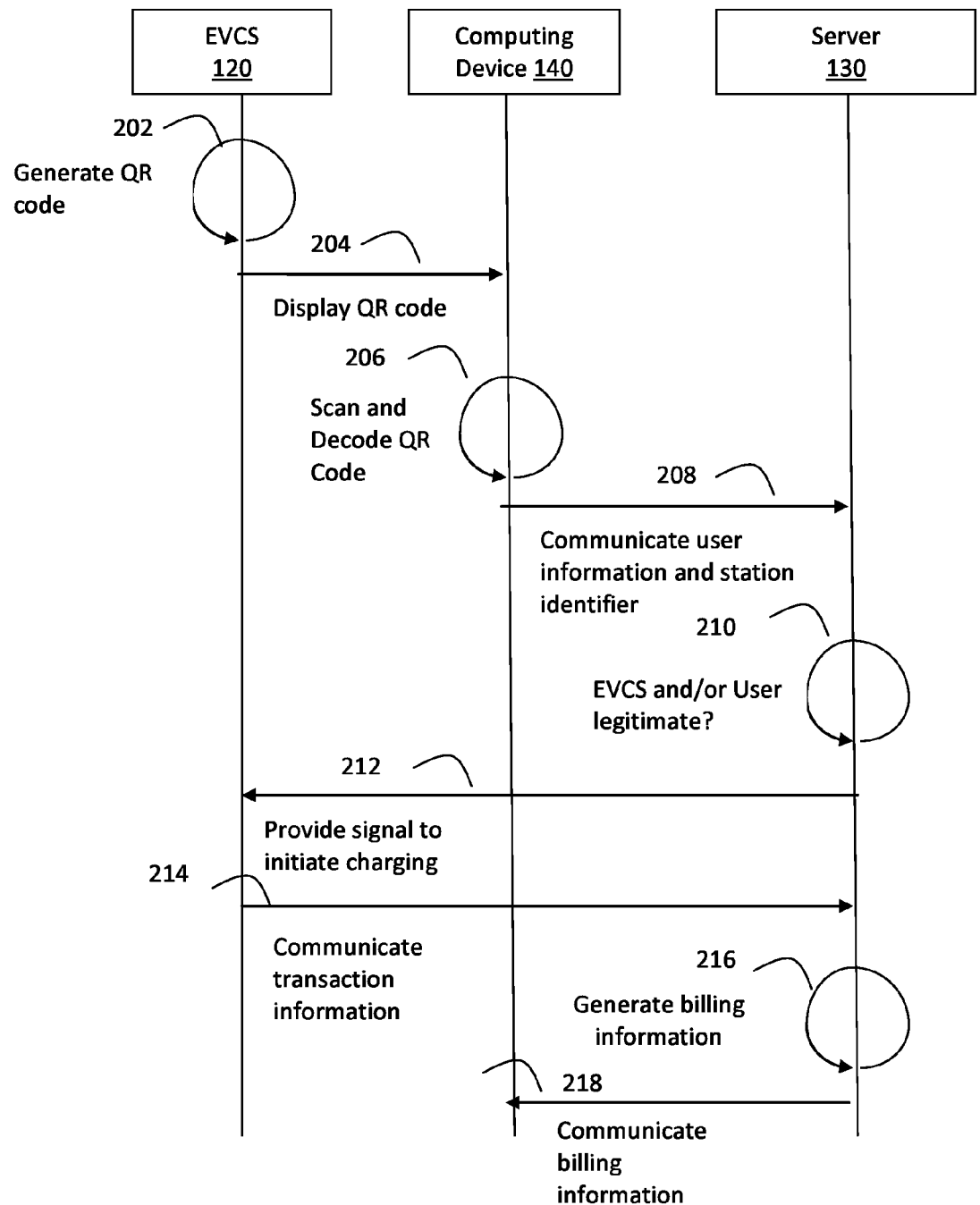
FIG. 2 illustrates a data flow diagram illustrating process relationships in an electric vehicle charging system, according to various implementations of the invention.

FIG. 2 depicts an exemplary data flow diagram illustrating process relationships in an electric vehicle charging system, according to various implementations of the invention. In some implementations, EVCS 120 may generate a code in operation 202. In some implementations, the code may include a graphic bit pattern that is configured to be decoded based on an optically captured representation of the code. In some implementations, the code may be encoded using an optical encoding that is configured to be decoded based on an optically captured representation of the code. For example, the graphical bit pattern/optical encoding may include a QR code, a bar code, and/or any other code that encodes information and is recognizable by devices such as a camera or other image capture/scanning device. In some implementations, for example, a camera of computing device 140 may be used to take a picture of the graphic bit pattern/optical encoding for decoding at computing device 140.

In some implementations, a user of an electric vehicle that needs to be charged/recharged may drive up to an EVCS 120 and plug the electric vehicle into the EVCS 120 for charging/recharging. In some implementations, in response to the electric vehicle being plugged into the EVCS 120, the EVCS 120 may generate the code in operation 202. In some implementations, the code may be unique for each EVCS 120. In other words, each EVCS 120*a* ... 120*n* may generate a unique code that includes a station identifier identifying the corresponding EVCS.

In some implementations, the EVCS 120 may encode the station identifier identifying the EVCS 120 into the code. Each EVCS 120 may have a station identifier associated with it and the corresponding station identifier may be encoded into the code displayed at the associated EVCS 120. In some implementations, the generated code may be displayed at a display 124 associated with the EVCS 120.

In some implementations, computing device 140 may capture the code displayed via EVCS 120 and decode the captured code, in operation 206. In some implementations, computing device 140 may include a camera which may be used to scan (i.e., optically capture) the code. In some implementations, computing device 140 may decode the code to retrieve the station identifier, and/or other information encoded in the code.

In some implementations, the computer application executing on the computing device 140 may prompt the user to scan the code. Once scanned, the computer application may decode the code. The computer application may retrieve the the encoded information (e.g., station identifier) from the code.

In some implementations, the code/graphic bit pattern/optical encoding displayed via EVCS 120 may have error correction built in, in the form of a hash or checksum, for example. Other forms of error correction may be used without departing from the scope of the invention. In some implementations, the computing device/computer application may verify that the scanned code is genuine based on the checksum, as would be apparent to one of ordinary skill in the art. In some implementations, the computing device 140/computer application may decode the code and communicate the decoded information to server 130, in response to checksum verification.

In some implementations, the user may login to the computer application prior to capturing and decoding the code from the EVCS 120. The user may enter his user id and password (i.e., user information) into a user interface associated with the computer application.

In some implementations, the computer application may display rates for charging/recharging the plugged electric vehicle using the EVCS 120 on a display screen (not otherwise illustrated in the FIGs) associated with the computing device 140. In some implementations, the rates may be communicated by to computing device 140 by server 130. In some implementations, server 130 may store various rates (e.g., peak rates, non-peak rates, etc.) in memory 135, for example. In some implementations, the computer application may receive the rates from server 130 upon login.

In some implementations, the computing device 140/computer application may communicate the decoded information (for example, station identifier, and/or other information) and/or the user information (for example, user id, password, and/or other user data) to server 130, in operation 208. In some implementations, computing device 140/computer application may communicate the decoded/user information in response to the user accepting the rates for charging/recharging.

Figure 3:
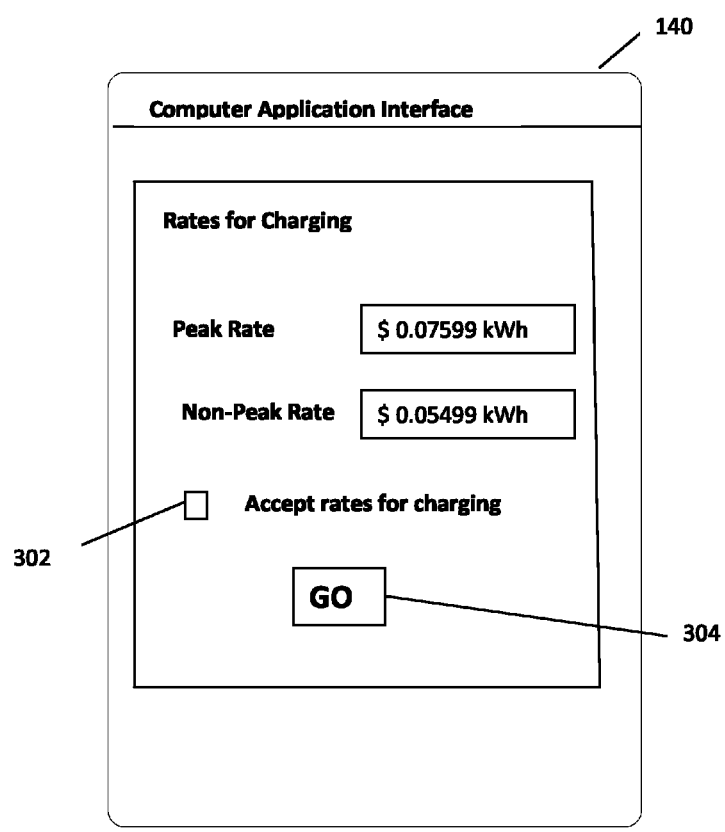
FIG. 3 illustrates an exemplary screenshot depicting rate information displayed via a computer application interface, according to various implementations of the invention.

FIG. 3 illustrates an exemplary screenshot depicting rate information displayed via a computer application interface, according to various implementations of the invention. FIG. 3 is for illustrative purposes only and should not be viewed as limiting. Various interface elements may be included, excluded, or otherwise configured differently as would be appreciated. As illustrated, FIG. 3 depicts rate information that can be displayed by, for example, computing device 140. Peak and non-peak rates for charging an electric vehicle may be displayed. User may accept the rates for charging the electric vehicle by selecting check-box 302. The user may then select the "GO" button 304. In response the user selection, the decoded/user information may be communicated to the server 130. In some implementations, the rate information acceptance may also be communicated to the server 130.

Referring back to FIG. 2, in some implementations, server 130 may receive the decoded station identifier. In some implementations, server 130 may determine whether the EVCS is legitimate based on the station identifier, in operation 210. In some implementations, server 130 may store a list of one or more EVCS's 120 and the associated station identifiers, in memory 135, for example. In some implementations, server 130 may compare the decoded station identifier with the stored station identifier(s) to determine whether there is a match. In response to a determination that is there is a match, server 130 may determine that the EVCS associated with the decoded station identifier is legitimate. In response to a determination that is there is no match, server 130 may determine that the EVCS associated with the decoded station identifier is not legitimate.

In some implementations, server 130 may receive the user information and verify the identity of the user based on the received user information, in operation 210. In some implementations, server 130 may compare the user information with the user id and password entered during registration to determine whether there is a match. In response to a determination that there is a match, server 130 may determine that the user's identity has been verified and that the user is a legitimate user. In response to a determination that there is no match, server 130 may determine that the user's identity has not been verified and that the user is not a legitimate user.

In some implementations, in response to a determination that the EVCS 120 is legitimate and/or in response to a determination that the users identity is verified, server 130 may provide a signal to the EVCS 120 to initiate charging of the vehicle plugged into the EVCS, in operation 212. In some implementations, the signal to initiate charging is communicated via network 115. In some implementations, in response to the signal, the EVCS may begin supplying AC voltage to the plugged in electric vehicle.

In some implementations, EVCS 120 may indicate via display 124 that the charging/recharging of the electric vehicle has been completed. In response, the user may unplug the vehicle from the EVCS 120.

In some implementations, EVCS 120 may generate transaction information upon the electric vehicle being unplugged from the EVCS 120. In some implementations, the transaction information may include, but not be limited to, start time of charging, end time of charging, energy used, user data, and/or other information. In some implementations, EVCS 120 may communicate the transaction information to server 130, in operation 214.

In some implementations, server 130 may generate billing information based on the transaction information received from the EVCS 120, in operation 216. In some implementations, the billing information may include, but not be limited to, a payment amount to be paid by the user for using EVCS 120 to charge the vehicle. In some implementations, server 130 may determine the payment amount based on the accepted rate information. For example, if the vehicle is charged during non-peak hours, server 130 may apply the non-peak rate to determine the payment amount. Similarly, if the vehicle is charged during peak hours, server 130 may apply the peak rate to determine the payment amount. In some implementations, server 130 may determine the payment amount based on the rate information and the transaction information (for example, start time of charging, end time of charging, and/or energy used).

In some implementations, server 130 may retrieve the charge account associated with the user and update the charge account based on the transaction information and/or the billing information. In some implementations, the charge account may be updated to reflect the payment amount to be paid by the user. In some implementations, server 130 may communicate the billing information to computing device 140, in operation 218.

Figure 4:
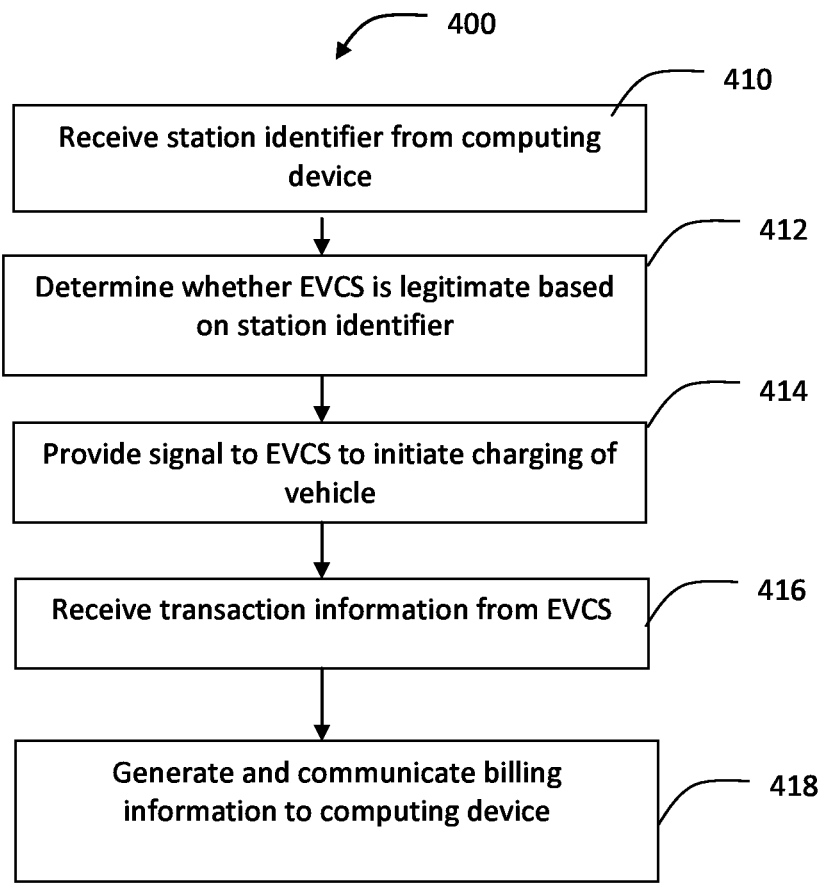
FIG. 4 illustrates a flowchart depicting example operations performed by a server in an electric vehicle charging system, according to various implementations of the invention.

FIG. 4 is a flowchart 400 depicting example operations performed by the server 130, according to various implementations of the invention. In some implementations, the described operations may be accomplished using one or more of the modules/components described herein. In some implementations, various operations may be performed in different sequences. In other implementations, additional operations may be performed along with some or all of the operations shown in FIG. 4. In yet other implementations, one or more operations may be performed simultaneously. In yet other implementations, one or more operations may not be performed. Accordingly, the operations described are exemplary in nature and, as such, should not be viewed as limiting.

In an operation 410, process 400 may receive a station identifier associated with an EVCS 120 which is being used for charging a plugged in electric vehicle associated with a user. In some implementations, the station identifier is received from computing device 140 associated with the user. In some implementations, the station identifier may be retrieved by decoding a code at the computing device 140. In some implementations, the code may include a graphic bit pattern that is configured to be decoded based on an optically captured representation of the code.

In an operation 412, process 400 may determine whether the EVCS 120 is legitimate based on the received station identifier. In some implementations, in an operation 414, process 400 may provide a signal to the EVCS 120 to initiate charging of the vehicle plugged in the EVCS in response to a determination that the EVCS 120 is legitimate.

In some implementations, process 400 may also receive user information from computing device 140. In some implementations, process 400 may verify the identity of the user based on the user information. In some implementations, process 400 may provide a signal to the EVCS 120 to initiate charging of the vehicle plugged in the EVCS in response to a determination that the EVCS 120 is legitimate and in response to the verification of the user identity indicating that the user is legitimate.

In an operation 416, process 400 may receive transaction information from the EVCS 120 upon the vehicle being unplugged from the EVCS 120. In an operation 418, process 400 may generate billing information based on the transaction information and may communicate the billing information to the computing device 140.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A method for billing transactions associated with an electric vehicle charging station (EVCS), the method comprising:
   at a server communicably coupled to a computing device associated with a user of an electric vehicle plugged into the EVCS:

receiving, from the computing device, a station identifier associated with the EVCS, wherein:
  the station identifier is retrieved by decoding a code at the computing device,
  the code includes a graphic bit pattern that encodes the station identifier,
  the code is configured to be decoded based on an optically captured representation of the code, and
  the code is displayed at a display associated with the EVCS and optically captured via an image capturing device associated with the computing device;
determining whether the EVCS is legitimate based on the received station identifier, wherein said determining comprises determining whether a match exists between the received station identifier and one or more previously stored station identifiers, and wherein the EVCS is determined to be legitimate in response to a determination that a match exists between the received station identifier and one or more previously stored station identifiers; and
in response to a determination that the EVCS is legitimate based on the received station identifier that is decoded from the optically captured code, triggering the EVCS to initiate charging of the electric vehicle plugged into the EVCS.

2. The method of claim 1, further comprising:
at the server:
  receiving user information associated with the computing device;
  verifying an identity of the user based on the received user information; and
  triggering the EVCS to initiate charging of the electric vehicle plugged into the EVCS based on the verification of the identity of the user and in response to the determination that the EVCS is legitimate.

3. The method of claim 1, wherein the code comprises a QR code.

4. The method of claim 1, further comprising:
at the server:
  receiving transaction information from the EVCS upon the electric vehicle being unplugged from the EVCS;
  generating billing information based on the transaction information; and
  communicating the billing information to the computing device.

5. The method of claim 4, wherein the billing information comprises a payment amount to be paid for using the EVCS to charge the electric vehicle.

6. The method of claim 5, wherein said generating the billing information further comprising:
  determining the payment amount based on rate information.

7. The method of claim 5, wherein the transaction information comprises start time of charging the electric vehicle and end time of charging the electric vehicle, and wherein said generating the billing information further comprising:
  determining the payment amount based on rate information and the transaction information.

8. A system for billing transactions associated with an electric vehicle charging station (EVCS), the system comprising:
  a computing device associated with a user of an electric vehicle plugged into the EVCS; and
  a server communicably coupled to the computing device, the server comprising a processor configured to:
    receive, from the computing device, a station identifier associated with the EVCS, wherein:
      the station identifier is retrieved by decoding a code at the computing device,
      the code includes a graphic bit pattern that encodes the station identifier,
      the code is configured to be decoded based on an optically captured representation of the code, and
      the code is displayed at a display associated with the EVCS and optically captured via an image capturing device associated with the computing device;
    determine whether the EVCS is legitimate based on the received station identifier, wherein the processor is further configured to determine whether a match exists between the received station identifier and one or more previously stored station identifiers, and wherein the EVCS is determined to be legitimate in response to a determination that a match exists between the received station identifier and one or more previously stored station identifiers; and
    in response to a determination that the EVCS is legitimate based on the received station identifier that is decoded from the optically captured code, trigger the EVCS to initiate charging of the electric vehicle plugged into the EVCS.

9. The system of claim 8, wherein the processor is further configured to:
  receive user information associated with the computing device;
  verify an identity of the user based on the received user information; and
  trigger the EVCS to initiate charging of the electric vehicle plugged into the EVCS based on the verification of the identity of the user and in response to the determination that the EVCS is legitimate.

10. The system of claim 8, wherein the code comprises a QR code.

11. The system of claim 8, wherein the processor is further configured to:
  receive transaction information from the EVCS upon the electric vehicle being unplugged from the EVCS;
  generate billing information based on the transaction information; and
  communicate the billing information to the computing device.

12. The system of claim 11, wherein the processor configured to generate billing information is further configured to:
  determine a payment amount to be paid for using the EVCS to charge the electric vehicle based on rate information and the transaction information.

13. A tangible computer readable medium having one or more computer-readable instructions thereon which when executed by one or more processors of a server cause the one or more processors to:
  receive, from a computing device associated with a user of an electric vehicle plugged into an electric vehicle charging station (EVCS), a station identifier associated with the EVCS, wherein:
    the station identifier is retrieved by decoding a code at the computing device, the code includes a graphic bit pattern that encodes the station identifier,
    the code is configured to be decoded based on an optically captured representation of the code, and the code is displayed at a display associated with the EVCS and optically captured via an image capturing device associated with the computing device;

determine whether the EVCS is legitimate based on the station identifier based on the received station identifier that is decoded from the optically captured code, wherein the one or more processors are further configured to determine whether a match exists between the received station identifier and one or more previously stored station identifiers, and wherein the EVCS is determined to be legitimate in response to a determination that a match exists between the received station identifier and one or more previously stored station identifiers; and in response to a determination that the EVCS is legitimate, trigger the EVCS to initiate charging of the electric vehicle plugged into the EVCS.

14. The tangible computer readable medium of claim 13, wherein the instructions further cause the one or more processors to:

receive user information associated with the computing device;

verify an identity of the user based on the received user information; and trigger the EVCS to initiate charging of the electric vehicle plugged into the EVCS based on the verification of the identity of the user and in response to the determination that the EVCS is legitimate.

15. The tangible computer readable medium of claim 13, wherein the instructions further cause the one or more processors to:

receive transaction information from the EVCS upon the electric vehicle being unplugged from the EVCS;

generate billing information based on the transaction information; and communicate the billing information to the computing device.

16. The tangible computer readable medium of claim 15, wherein the instructions causing the processors to generate billing information further cause the one or more processors to:

determine a payment amount to be paid for using the EVCS to charge the electric vehicle based on rate information and the transaction information.

17. A tangible computer readable medium having one or more computer-readable instructions thereon which when executed by one or more processors of a computing device cause the one or more processors to:

capture a code displayed on a display associated with an electric vehicle charging station (EVCS), wherein:
the code includes a graphic bit pattern that encodes a station identifier that identifies the EVCS,
the code is optically captured via an image capturing device associated with the computing device, and
the computing device is associated with a user of an electric vehicle plugged into the EVCS;

decode from the optically captured code the station identifier; and communicate the station identifier to a server, wherein the electric vehicle plugged into the EVCS is charged based on a verification of the station identifier.

18. An electric vehicle charging station (EVCS) comprising:

a processor configured to generate a code in response to an electric vehicle being plugged into the EVCS, wherein the code includes a graphic bit pattern that encodes a station identifier associated with the EVCS; and a display configured to display the code, wherein:
the code is optically captured via an image capturing device associated with a computing device and decoded to obtain the station identifier encoded therein,
the computing device is associated with a user of the electric vehicle, and
the processor is further configured to initiate charging of the electric vehicle based on a verification of the station identifier.

* * * * *